(12) United States Patent
Otaki et al.

(10) Patent No.: US 6,403,208 B1
(45) Date of Patent: Jun. 11, 2002

(54) THERMAL INSULATING ARTICLE AND METHOD OF MANUFACTURING SAME

(75) Inventors: Keiji Otaki, Koriyama; Kanichiro Onodera, Suzuka, both of (JP)

(73) Assignee: Paramount Glass Manufacturing Co., Ltd., Koriyama (JP)

( * ) Notice: Subject to any disclaimer, the term of this patent is extended or adjusted under 35 U.S.C. 154(b) by 0 days.

(21) Appl. No.: 09/744,919

(22) PCT Filed: Jul. 1, 2000

(86) PCT No.: PCT/JP00/03555

§ 371 (c)(1),
(2), (4) Date: Jan. 31, 2001

(87) PCT Pub. No.: WO00/75442

PCT Pub. Date: Dec. 14, 2000

(30) Foreign Application Priority Data

Jun. 2, 1999 (JP) ............................................. 11-154615

(51) Int. Cl.[7] ................................................. B32B 27/04
(52) U.S. Cl. .............................. 428/300.7; 428/297.4; 428/297.7; 428/301.4; 156/285; 156/296; 156/306.3; 156/308.4
(58) Field of Search .......................... 428/293.4, 294.1, 428/296.4, 296.7, 297.4, 300.1, 297.7, 300.7, 301.4; 156/306.3, 290, 285, 308.4, 296, 304.1

(56) References Cited

FOREIGN PATENT DOCUMENTS

| JP | U 52-162710 | | 12/1977 |
|---|---|---|---|
| JP | U 53-96076 | | 8/1978 |
| JP | 6079849 | * | 1/1992 |
| JP | A 6-79849 | | 3/1994 |
| JP | A 8-290500 | | 11/1996 |
| JP | 9178356 | * | 4/1997 |
| JP | U 53-104778 | | 8/1997 |
| JP | B2 2820641 | | 8/1998 |

* cited by examiner

Primary Examiner—Merrick Dixon
(74) Attorney, Agent, or Firm—Oliff & Berridge, PLC

(57) ABSTRACT

A thermal insulating and sound absorbing mat a mat cut to a predetermined length, upper and lower films covering lateral surfaces and front and rear end surfaces of the mat with respective minimal required lengths. The films are not damaged during the compression and packaging process nor torn by the internal pressure of the mat during the unpacking operation. The produced thermal insulating article has a structure that meets the requirements of JIS. Such thermal insulating articles can be manufactured by a highly productive method. Mats cut to a predetermined length are transferred sequentially side by side with an interval between adjacent mats such that the films have respective minimal required lengths. Each mat is covered by the films at the upper and lower surfaces and the lateral surfaces. Then, adjacent mats are stopped at a predetermined position with the interval, and are pushed downwardly at the oppositely disposed end surfaces to a predetermined height. Thereafter, the front and end surfaces are covered by the upper film while maintaining the compression, and the films are bonded together along the lower end lugs and cut.

3 Claims, 6 Drawing Sheets

THERMAL INSULATING ARTICLE AND METHOD OF MANUFACTURING SAME

FIELD OF THE INVENTION

This invention relates to a thermal insulating article prepared by covering a mat made of inorganic fibers such as glass wool or rock wool, with a film coat along an entire surface including upper and lower surfaces, lateral sides and front and rear sides, and also relates to a method of manufacturing such a thermal insulating article.

RELATED BACKGROUND ARTS

According to prior arts, thermal insulating articles made of inorganic fibers such as those of glass wool or rock wool have a stimulating itchy effect specific to such fibers, so that they are normally covered with a film coat in order to eliminate such a stimulating effect and also prevent the degradation of the thermal insulating article due to dew condensation.

However, in the case of prior thermal insulating article "A" covered with such a film coat as disclosed in Japanese Patent No. 2,820,641, the mat is not covered with the outer film coat at the lateral sides "B" as shown in FIG. 8 of the accompanying drawings, so that it can give rise to an unpleasantly stimulating itchy effect by fine fibers scattered from those sides.

Japanese Patent Laid-Open Nos. 53-39067 and 6-79849 and Japanese Utility Model Laid Open No. 52-162710 disclose techniques for covering a mat of inorganic fibers with a film coat along the entire surface including the upper and lower surfaces, the lateral sides and the front and rear sides. Coated mats according to the above described patent are normally compressed for packaging for the purpose of improving the efficiency of packing and packaging. Thus, the film coat is perforated to discharge or release air in the inside, and/or the end lugs binding the opposite edges of the film coat is made apt to aerate in order to quickly discharge air from the inside of the mat, to prevent the film coat from being torn by bursting air at the time of compressing and packaging, and to make air quickly flow into the inside to expand the mat after unpacking.

More specifically, Japanese Patent Laid-Open No. 53-96076 discloses means for manufacturing a thermal insulating article having a predetermined length, wherein mats of the above described type having an appropriate thickness and a predetermined length are constantly moved on a line at regular intervals, while covering them by a film from above and below in a continuous operation, and heating and fusing the upper film and the lower film for bonding along the lateral sides and also at the front and rear ends of each mat at appropriate respective positions on the line. Then, the fused areas of the film are cut along the center line thereof to produce thermal insulating articles having the predetermined length.

According to Japanese Patent Laid-Open No. 6-79849, mats typically made of glass wool and thermoplastic resin film are fed simultaneously, and the film is partly heated and fused for bonding along the front and rear edges of each mat as viewed in the feeding direction. Subsequently the film is cut along the thermally fused and bonded areas, and partly torn apart along the feeding direction in the areas that are not thermally fused, so that consequently the film show a predetermined length for each mat. Then, the pieces of film cut apart are used to cover the lateral sides and the front and rear sides of the mat to complete the process of forming a thermal insulating article.

A mat according to either of the above patent documents are accompanied by the following problems.

Firstly, referring to FIG. 2 of the accompanying drawings, excessive film corresponding to the sealing length $L_1$ is required for the film to sufficiently cover the front and rear ends of the mat, so that the film cost rises as a function of the length $L_1$ in the manufacturing process. In other words, the sealing length $L_1$ has to be reduced to suppress the film cost and hence the manufacturing cost, although no means is proposed for cost reduction.

FIG. 3 of the accompanying drawings schematically illustrates the mat and the film covering the upper and lower surfaces of the mat. If the length W of the end lugs is too long, it would be pinched by and/or entangled by the packaging machine in the compression/packaging process, to interfere with and stop the operation of the machine, and to reduce the efficiency of the operation. Additionally, the end lugs would extend to the outside of the installation frame for containing the thermal insulating article, so that the extended part of the film may have to be cut, to increase the work load and prolong the installing operation.

If the compressed and packaged thermal insulating article is used for thermal insulation and sound absorption, it is normally compressed to a size equal to ½ to ¹/₁₀ of the size provided in JIS (Japanese Industrial Standards) for packaging. Then, the compressed thermal insulating article has to be made to restore the size conforming to JIS.

If the sealing length $L_1$ is reduced to dissolve the first problem, the upper film and the lower film would be peeled off from each other along bonded areas due to the resilient force of the compressed mat.

If the sealing length $L_1$ is reduced by compressing the mat between the front and rear ends, to make it smaller than the size defined by JIS before covering it with film, the film tension would be raised to press the mat, so that the mat would not restore the original size to meet the dimensional requirement of JIS.

Finally, since the film is thermally fused and bonded while compressing the mat by the tension of the film, the bonding areas of the film would be laterally displaced by the film tension, so that the bonding of the film would not be satisfactory and/or the film would be torn. While these problems may be eliminated by using a thick film, such a film will by turn raise the manufacturing cost.

SUMMARY OF THE INVENTION

In view of the above identified problems of the prior art, it is therefore an object of the present invention to provide a thermal insulating article that is completely covered by a film coat along the entire surface thereof to meet the requirements of the applicable standards in terms of structure, strength and so on and still can be manufactured and installed efficiently at low cost. Another object of the present invention is to provide a method of manufacturing such thermal insulating articles in a continuous way.

According to the present invention, the above objects and other objects of the invention are achieved by providing a thermal insulating article comprising a rectangularly parallelepipedic mat of an aggregate of inorganic fibers, a synthetic resin upper surface film and a synthetic resin lower surface film; wherein said upper surface film covers an upper surface of said mat, is bent to extend to a lower surface of the mat along lateral surfaces of the mat, and is bonded to the lower surface film along edge lugs;

said upper surface film is bent to extend to the lower surface along front and rear surfaces of the mat, and is bonded to the lower surface film; characterized in that said mat comprises a front end section, a rear end section and a central section;

said mat with the upper surface film is pressed downwardly at the front and rear end sections by a predetermined depth;

the front end surface, the rear end surface and the upper surface of the mat are covered by the upper surface film which has a sum of a length for covering the upper surface of the mat, a length to be used for being bonded to the lower surface film and a marginal length produced by reducing the thickness of the mat at the front and rear end sections; and said mat has a predetermined thickness at the central section.

In another aspect of the present invention, there is also provided a method of manufacturing a thermal insulating article comprising a mat of inorganic fibers, an upper surface film bonded to an upper surface of the mat and a lower surface film bonded to a lower surface of the mat, said upper surface film and said lower surface film being bonded to each other along edge lugs and end lugs of the thermal insulating article; said method comprising steps of:

forming a continuous source mat of inorganic fibers having a predetermined density and a predetermined thickness by means of a drying machine;

forming rectangularly parallelepipedic unit mats by cutting the continuous mat to a predetermined length;

feeding unit mats intermittently so as to make adjacent mats show an interval therebetween by regulating switching time of a stopper, the interval being sum of a length of the upper surface film necessary for it to cover the oppositely disposed end surfaces of the adjacent mats and a length of the upper surface film necessary for it to be bonded to the lower surface film;

covering the upper surface of each mat by the upper surface film by bonding the upper surface film to the upper surface of the mat, and also covering the lower surface of the mat by bonding the lower surface film to the lower surface of the mat;

bonding the upper surface film and the lower surface film along the edge lugs;

causing the mat to pass through a sag absorbing section, and feeding it to a sealing machine;

stopping the mat at a time of alignment of a center position of the interval of adjacent mats and a center of said sealing machine;

compressing the rear end section of a mat and the front end section of the adjacent mat to a predetermined thickness, and maintaining the compression;

pressing the upper surface film downwardly between the rear end section of a mat and the front end section of the adjacent mat, to contact the upper surface film to the lower surface film along the rear end surface of a mat and the front end surface of the adjacent mat;

bonding the upper surface film and the lower surface film near the rear end surface of a mat and the front end surface of the adjacent mat; and cutting the upper surface film and the lower surface film at said center position, to form the thermal insulating article.

PREFERRED EMBODIMENTS

Figure 1:
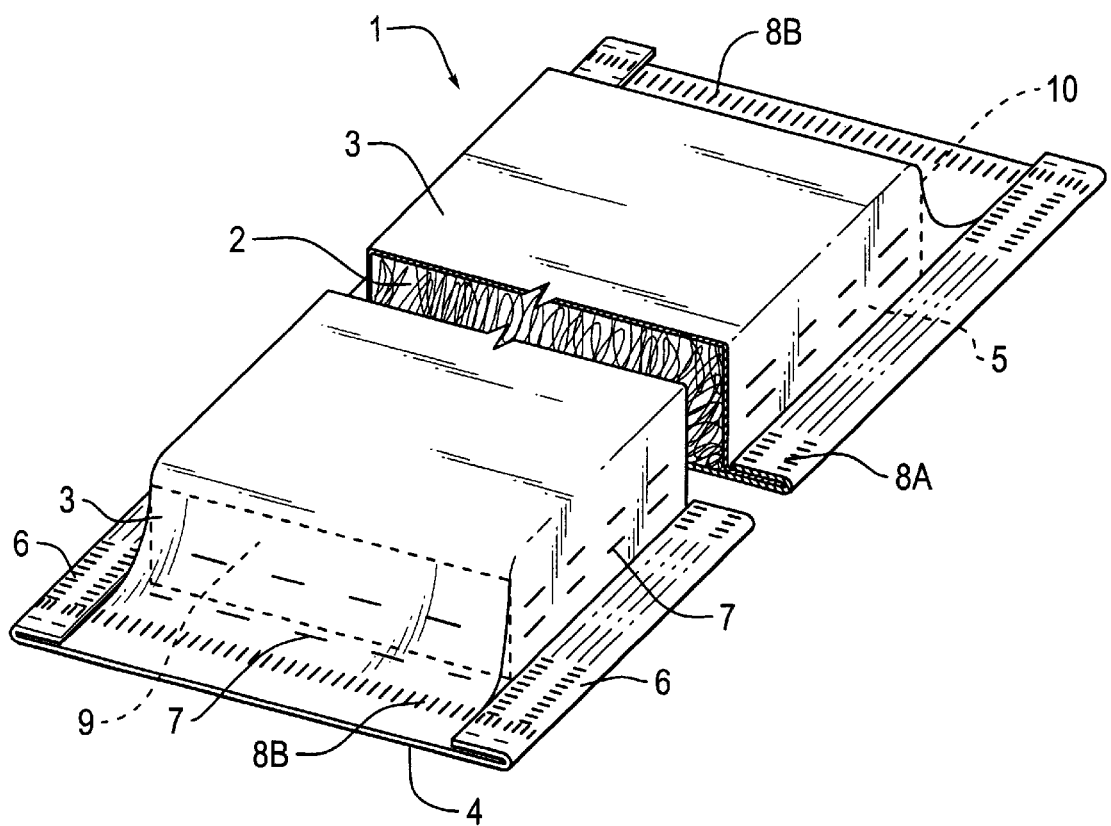
FIG. 1 is a partly omitted schematic perspective view of an embodiment of a thermal insulating article according to the invention.

FIGS. 1 through 4 schematically illustrate a preferred embodiment of a thermal insulating article according to the invention. The thermal insulating article 1 illustrated in FIG. 1 comprises a rectangularly parallelepipedic mat 2 which is made of an aggregate of inorganic fibers and has thermal insulative properties, an upper surface film 3 made of synthetic resin covering an upper surface of the mat 2 as film coat, and a lower surface film 4 made of synthetic covering a lower surface of the mat 2 as film coat. The thermal insulating article 1 has lateral surfaces 5, each of which is a longitudinal edge surface, a front end surface 9 that is an end surface, a rear end surface 10 that is another end surface, edge lugs 6, each of which extends laterally outwardly from a lower edge of each of the lateral surfaces 5, and end lugs 11, each of which extends forwardly and backwardly from each of lower edges of the front and rear end surfaces 9 and 10. Said upper surface film 3 and said lower surface film 4 are bonded together along the edge lugs 6 and the end lugs 11 for sealing to produce a complete thermal insulating article 1.

Said upper surface film 3 is bent so as to extend along the lateral surface 5 to the lower surface of the thermal insulating article 1, and is bonded to the lower surface film 4 along the edge lug 6. At each of the end 9, 10, the upper surface film 3 and the mat 2 are pushed and compressed downwardly to the lower surface film 4 in a manner as described hereinafter, and the upper surface film 3 is bonded to the lower surface film 4 along the end lug 11. Thus, the mat 2 is entirely sealed by the upper surface film 3 and the lower surface film 4 along the entire periphery thereof, so as to prevent fine fibers scattering to prevent itchy.

The upper surface film 3 is provided in each of the lateral surfaces 5 with air holes 7 intermittently arranged in a plurality of rows running along the longitudinal direction of the thermal insulating article 1, and is also provided in each of end surfaces 9 and 10 with air holes 7.

Since the air holes 7 are provided, air contained in the mat 2 covered by the films 3, 4 can easily be discharged through the air holes 7, when the mat 2 is compressed and packaged.

At each of the edge lugs 6, said upper surface film 3 and said lower surface film 4 are bonded to each other at a plurality of bonding areas 8A. Said plurality of bonding areas 8A are arranged along the longitudinal direction. At each of the end lugs 11, said upper surface film 3 and said lower surface film 4 are bonded to each other at a plurality of bonding areas 8B. Each of said bonding areas 8A, 8B may be in the form of linear slits or spots.

Figure 2:
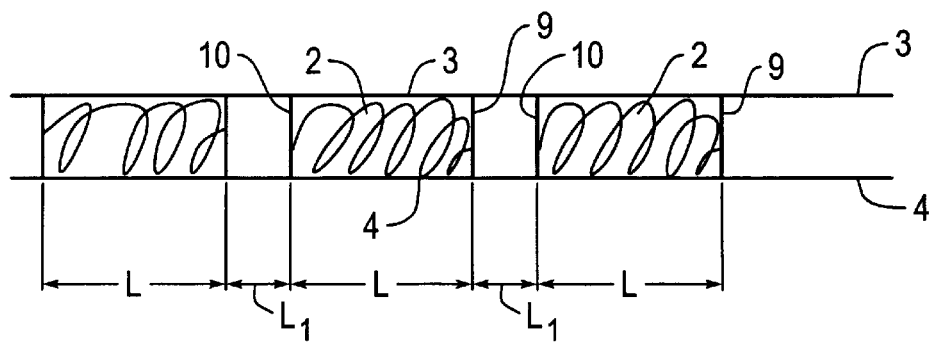
FIG. 2 is a schematic illustration showing the relationship between the length of each mat and the sealing length in case of manufacturing the mat illustrated in FIG. 1.

FIG. 2 is a schematic illustration showing a relationship between a length L of each mat and a sealing length $L_1$ in the continuous manufacturing process of the mats illustrated in FIG. 1.

Figure 3:
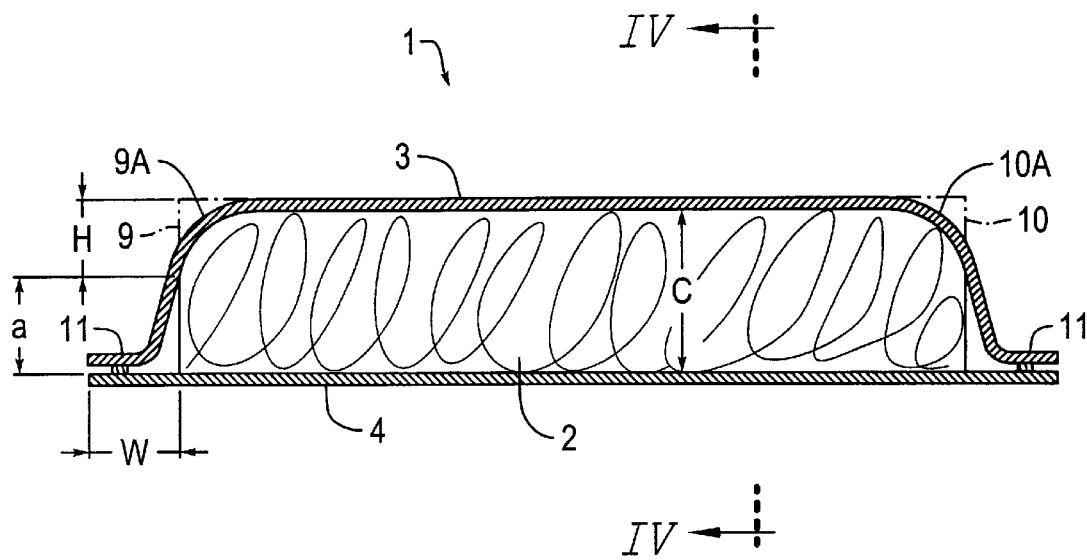
FIG. 3 is a schematic longitudinal cross sectional view of the mat of the embodiment of FIG. 1.

Said sealing length $L_1$ is the sum of a length of the upper surface film 3 necessary for covering the front and the rear end surfaces 9, 10 of the mat 2, and a length of the upper surface film 3 between the rear end surface 10 of a mat and the front end surface 9 of the adjacent mat. Between the rear end surface 10 of a mat and the front end surface of the adjacent mat, the upper surface film 3 and the lower surface film 4 are bonded to each other to form a pair of end lugs 11. The length $L_1$ is defined or determined in a manner as described below. The mat 2 has a central section having a thickness C, a front end section 9A and a rear end section 10A, as illustrated in FIG. 3. When the thermal insulating article 1 is packaged, it is compressed and hence the mat 2 is also compressed. The compressed dimension H (a vertical distance between the upper surface of the mat at the central section and the top of each of the end surfaces 9, 10) is so determined as to allow the compressed mat 2 to maintain a predetermined thickness "a" at the ends 9 and 10 when the thermal insulating article is compressed. The length $L_1$ is determined or obtained from the compressed dimension H. As a result, when the thermal insulating article is relieved from the compressed state, the central section of the thermal insulating article shows a dimension infinitely close to the value provided in Japanese Industrial Standards.

Figure 5:
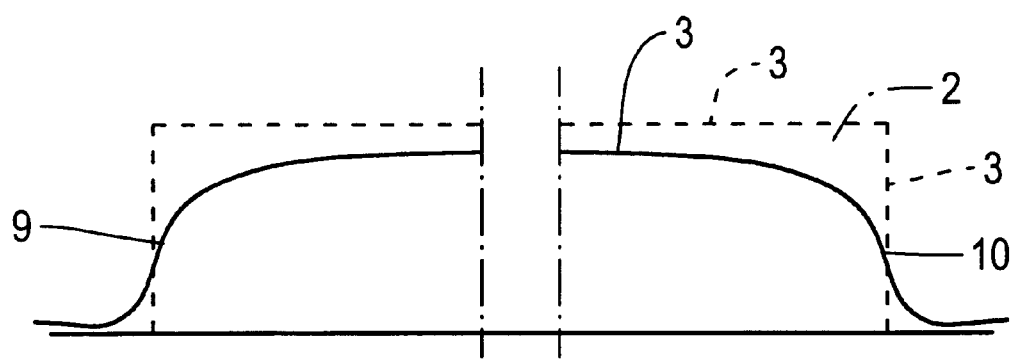
FIG. 5 is a schematic cross sectional view of a thermal insulating article of a prior art, showing how it is deformed at the front and rear ends by the film coat.

According to the prior art, a thermal insulating article is compressed by merely pressing the upper film 3 downwardly toward the lower film 4 along the end surfaces 9, 10 from the original position as indicated by broken lines in FIG. 5. In other words, the prior art lacks a consideration or concept of maintaining thickness "a" at the ends 9, 10 of the mat 2 when the thermal insulating article is compressed. According to the prior art, a mat having a thickness greater than the predetermined thickness by 10 to 30% (as indicated by broken lines in FIG. 5) is compressed as shown in FIG. 5 schematically illustrating how a prior art mat is compressed, and the upper and lower films are cut while the mat is held in the compressed state. Therefore, rebound resilience due to the compressive force is concentrated to the bonding areas of the upper and lower films, to make the bonding areas easily become separated or torn apart. Furthermore, since the force pressing the ends 9A, 10A downwardly acts to the central section to pull the central section to the ends. Thus, the thermal insulating article is made to show a bowed longitudinal cross section as shown in FIG. 5 so that the central section cannot maintain a uniform thickness C.

According to the present invention, the mat is compressed at the front and the rear ends 9A, 10A by height H to secure a predetermined thickness "a" for the front and the rear ends 9, 10 as will be discussed hereinafter, and then the upper surface film 3 and the lower surface film 4 are bonded together. Therefore, the central section of the mat 2 is not subjected to any excessive tensile force, so that the problem of the prior art as pointed out above does not arise.

In the above described embodiment, air holes may be formed on the upper surface film 3 and/or the lower surface film 4 of the thermal insulating article 1 in order to allow the thermal insulating article to permeate moisture therethrough. Additionally, the bonded areas of the end lugs 11 of the thermal insulating article 1 may be realized in the form of a single or plurality of rows of continuous strips, discontinuous short strips or round spots. Still additionally, the intervals separating the discontinuous bonded areas may be used for air holes.

In the above described embodiment, the upper and lower surface films 3, 4 and the mat 2 may be bonded by using the heat sensitive bonding ability of the films or by using an appropriate adhesive of the hot melt type or some other type. The thermal insulating article according to the invention can operate as a sound absorbing thermal insulating article.

Figure 6:
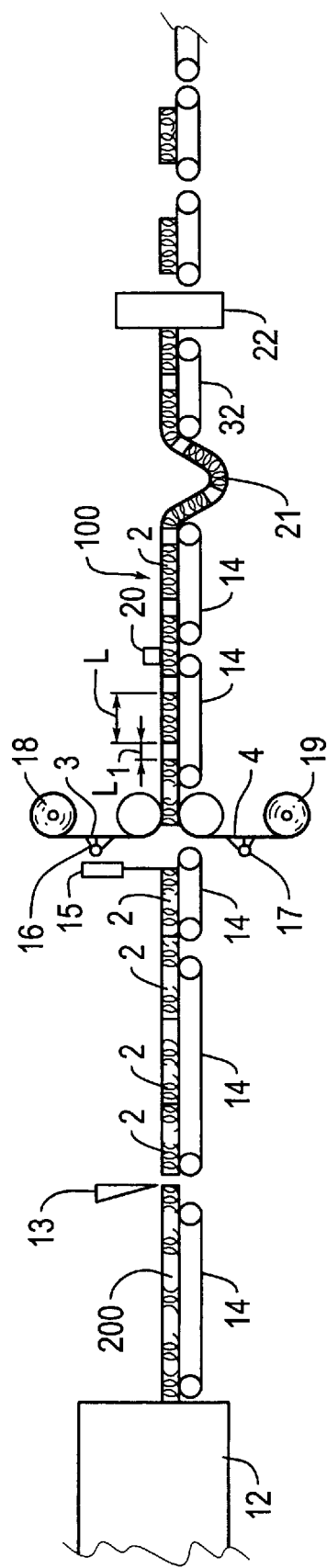
FIG. 6 is a schematic illustration of an embodiment of manufacturing method according to the invention, showing a manufacturing step thereof.
Figure 7:
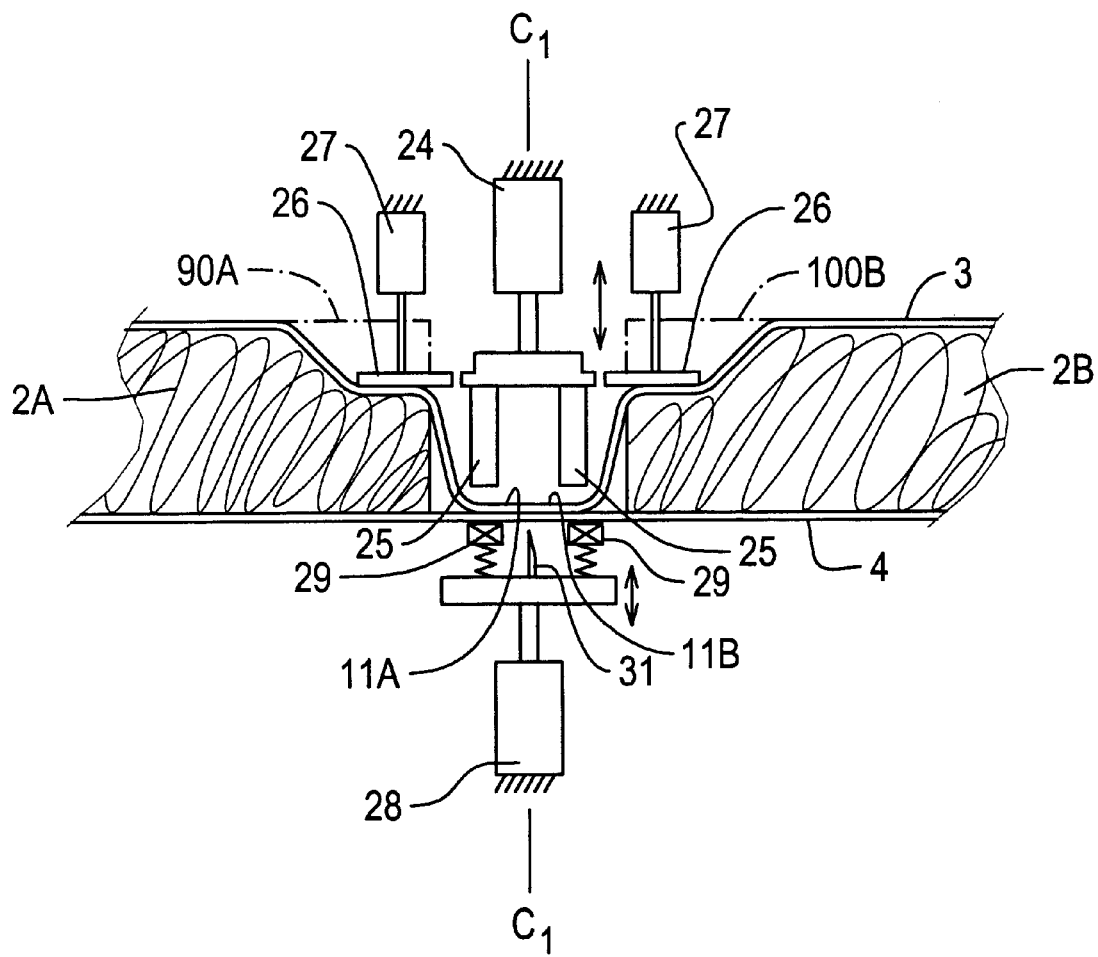
FIG. 7 is a schematic partial cross sectional view of a sealing section as observed in the manufacturing step of FIG. 6.
Figure 8:
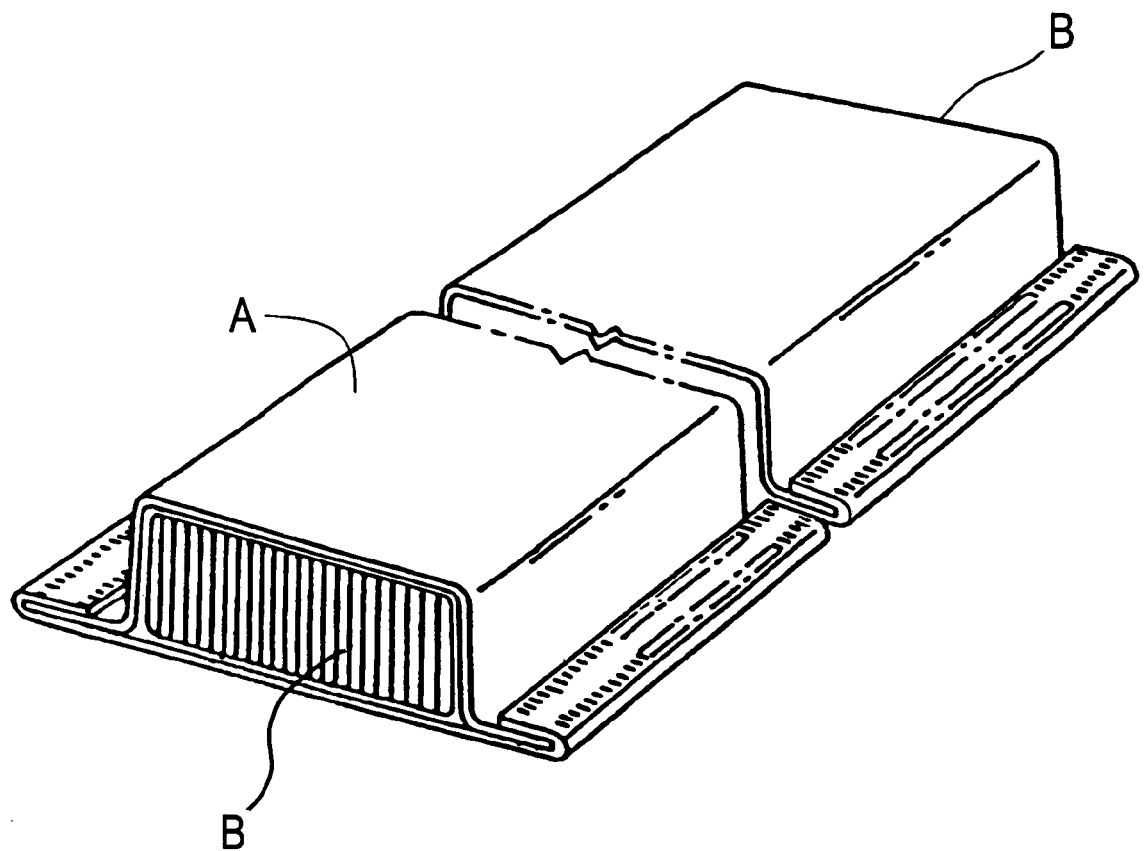
FIG. 8 is a schematic perspective view of a thermal insulating article according to a prior art.

FIGS. 6 and 7 schematically illustrate an embodiment of the method of manufacturing the thermal insulating article according to invention. FIG. 6 shows the manufacturing process using a manufacturing apparatus 100. In the illustrated embodiment, the method of manufacturing the thermal insulating article comprises steps of (1) molding a continuous source mat and drying it, (2) cutting the continuous mat to a predetermined length, (3) intermittently feeding unit mats thus obtained, (4) bonding the upper surface film to the upper surface of each unit mat and bonding the lower surface film to the lower surface of each unit mat, (5) bonding the upper surface film and the lower surface film along the edge lugs thereof, (6) intermittently feeding unit mats thus obtained, (7) regulating a sag caused by time lag between the above described mat cutting/transferring step and the above described step for bonding and cutting films while suspending the supply of mats, (8) feeding the mat to a sealing machine, (9) stopping the mat when a center position of the interval of adjacent mats is aligned to a center of the sealing machine, (10) compressing the rear end of a mat and the front end of the adjacent mat to a predetermined thickness and maintaining the compression, (11) pressing the upper surface film downwardly between the front end section of a mat and the front end section of the adjacent mat, and contacting the upper surface film to the lower surface film along the rear end surface of a mat and the front end surface of the adjacent mat, (12) bonding the upper surface film to the front end surface of a mat and the rear end surface of the adjacent mat, (13) bonding the upper surface film and the lower surface film together along the end lugs, and (14), cutting the films to produce individual mats.

A continuous source mat 200 is molded and dried to show a predetermined density and a predetermined thickness by means of a drying machine 12, and then transferred continuously by means of a conveyor 14. Thereafter, the continuous mat 200 is cut to a predetermined length by means of a cutting machine 13 to produce unit mats 2. Each unit mat 2 is then transferred to a stopper 15. An interval of adjacent feeding mats 2 is regulated by the switching time of the stopper 15, so that unit mats are fed intermittently after passing through the stopper 15.

An upper surface film 3 and a lower surface film 4 are drawn out respectively from an upper film feeder 18 and a lower film feeder 19 at a rate coordinated to the speed of transferring mats 2.

Then, adhesive is applied to a lower surface of the upper surface film 3 and an upper surface of the lower surface film 4 drawn out respectively from the film feeders 18, 19 by means of a sprayer 16 for the upper surface film 3 and a sprayer 17 for the lower surface film 4 disposed respective to the films 3, 4. The upper surface film 3 covers the upper surface of the mat 2 and is bonded thereto, while the lower surface film 4 is covers the lower surface of the mat 2 and is bonded thereto. Since mats 2 are supplied intermittently, a mat and the adjacent mat are separated by length $L_1$, and are bonded to the upper surface film 3 and the lower surface film 4. The mat 2 bonded with the films 3, 4 is then brought to an edge lugs bonding apparatus 20, where the upper surface film 3 and the lower surface film 4 are bonded together along the edge lugs 6 at a plurality of bonding areas 8A.

Then, the front end surface 9A of a mat 2 and the rear end surface 10B of the adjacent mat are covered by the films 3, 4 by means of a sealing machine 22, which will be described hereinafter (FIG. 7). The sealing machine 22 covers the both end surfaces 9A and 10B with the films 3, 4, compresses the front end 90A of a mat 2 and the rear end 100B of the adjacent mat from above toward the bottom, and bonds and cuts the films 3, 4 between said front end surface 9A and said rear end surface 10B. The mat 2 is also compressed, as will be described hereinafter. In order to compress the mat at the end, and in order to bond and cut the films, it is necessary to stop or suspend the transfer of the mat. Therefore, mats are intermittently transferred by means of an intermittent conveyor 32. Since the conveyor 14 is continuously feeding mats and since the conveyor 32 is intermittently transferring mats 2 with the films 3, 4, a sag regulating section 21 is arranged, so that the conveyor 14 can safely or smoothly feed mats corresponds to the difference or discrepancy of the feeding speeds.

When bonding the films 3, 4 between the rear end surface 10B of the mat 2 and the front end surface 9A of the adjacent mat, it may be considered that the operating speed of the sealing machine 22 and the transfer rate of the mat 2 are coordinated in a manner as disclosed in Japanese Patent Laid-Open No. 53-96076 (without the intermittent supply of mats by the conveyor 32, in such case). However, in view of an initial investment cost for an equipment, a simplicity of a moving mechanism, an operability and a reliability of a bonding operation, the present invention supplies mats intermittently by means of the conveyor 32, and does not move the sealing machine 22. Thus, the sag that arises in the mat 2 with the films 3, 4 due to the stop of the transfer is absorbed and eliminated by the sag absorbing/regulating section 21.

FIG. 7 is a schematic cross sectional view of the sealing machine 22, illustrating its configuration. In order to obtain or secure the minimum sealing length $L_1$ necessary for covering the front end surface 9A and the rear end surface 10B of the mat 2, a position sensor (not shown) of the sealing machine 22 detects a position of the mat 2 corresponding to $\frac{1}{2}L_1$, and when the position of the mat 2 corresponding to $\frac{1}{2}L_1$ is aligned with the central position of the sealing machine 22, the transfer of the mat 2 is suspended or stopped.

The sealing machine 22 has an upper cylinder 24, a lower cylinder 28 and a pair of press cylinders 27. The upper cylinder 24 is arranged at a central position $C^1$—$C^1$ where the continuous end lugs 11A, 11B between two adjacent mats 2A, 2B. The upper cylinder 24 is provided at an end thereof with a pair of downwardly projecting heaters 25, which are disposed at the front and back of the central position $C^1$—$C^1$, each of which corresponds to an area of the films for forming the end lugs 11A, 11B.

Said press cylinders 27 is located near the upper cylinder 24, and arranged at positions corresponding respectively to the front end 90A of the mat 2A and the rear end 100B of the mat 2B as indicated by dotted lines in FIG. 7. Each of the press cylinders 27 is provided with a pusher plate 26. Each of the press cylinders 27 moves upwardly and downwardly, to compress the ends 90A, 100B by each of the respective pusher plates 26 in order to make the ends show a predetermined thickness "a" as illustrated in FIG. 3.

The lower cylinder 28 is arranged at the central position $C^1$—$C^1$, and faced to the upper cylinder 24. The lower cylinder 28 moves upwardly and downwardly. The lower cylinder 28 is provided at a top thereof with a table 30. The table 30 supports a pair of receiving blocks 29 by respective springs. Each of the receiving blocks 29 is faced to the respective heaters 25. The lower cylinder 28 is provided with a cutter 31 in a center between the receiving blocks 29. The cutter 31 cuts the films 3, 4 at the central position $C^1$—$C^1$ to form the end lugs 11A, 11B.

A mat 2B and the adjacent mat 2A are moved from left to right in FIG. 7. When the central position $C^1$—$C^1$ of the mats between the rear end 100B of the mat 2B and the front end 90A of the mat 2A is aligned with the central position $C^1$—$C^1$ of the sealing machine 22, the movement of the mats 2A, 2B is stopped or suspended. Then, the press cylinders 27 are lowered to compress the ends 90A, 100B by the respective pusher plates 26, to make them show the predetermined thickness "a" (FIG. 3). In this case, the upper surface film 3 is held by the pusher plates 26 to a position lower than the height C by height H (FIG. 3). Therefore, the minimum length necessary for the upper surface film 3 to cover the gap between the rear end surface 10B and the front end surface 9A is reduced by 2H. In other words, the upper surface film 3 is allowed to have a longitudinal margin of 2H. Under such condition, the upper cylinder 24 moves downwardly and the lower cylinder 28 moves upwardly, to bond the upper surface film 3 and the lower surface film 4 by means of the receiving blocks 29 and the heaters 25. Subsequently, the bonded areas of the upper surface film 3 and the lower surface film 4 are cut at the central position $C^1$—$C^1$ by means of the cutter 31 to produce the end lugs 11A, 11B.

The upper surface film 3 may be provided with air holes 7 in advance at an area corresponding to the end surfaces 9, 10 of thermal insulating article 1. The upper surface film 3 and the lower surface film 4 may be bonded over the entire width of the end lug 11 or intermittently at the end lug 11. If the upper surface film 3 and the lower surface film 4 are bonded intermittently at the end lug 11, the gaps between the bonded areas are used for air flow paths.

Before the upper cylinder 24 moves downwardly, the pusher plates 26 move downwardly, to firstly push and compress the mat 2 at the front and rear ends 90A, 100B. The dimensions are determined such that the compressed front and rear ends 90A, 100B show a predetermined thickness "a" as shown in FIG. 3, so as to obtain the desired minimum sealing length $L_1$.

Then, the mat 2 now covered by the films over the entire surface thereof is transferred to the packaging step.

Now, the present invention will be described by way of an example, although the present invention is not limited to the example.

Figure 4:
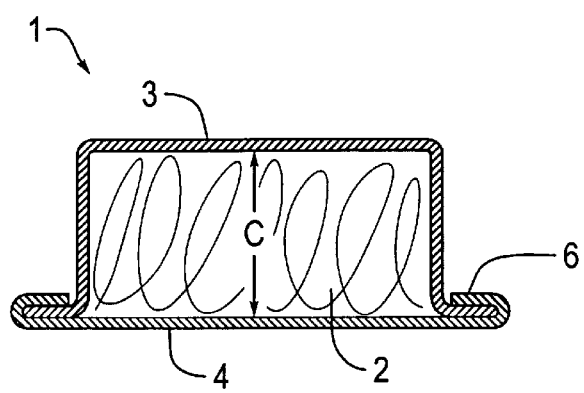
FIG. 4 is a schematic cross sectional view of the mat taken along line X—X in FIG. 3.

A thermal insulating article 1 as shown in FIGS. 1, 3 and 4 was prepared. The mat 2 was made of glass wool, showing a density of 10 Kg/m³, a width of 430 mm, a length L of 1370 mm, a thickness C of 140 mm at the center, a thickness "a" of 110 mm at the edge, and a compressed height H of 30 mm. The end lugs 11 had a width W of 50 mm. The upper surface film 3 was a high density polyethylene sheet with a film thickness of 15 $\mu$m, while the lower surface film 4 was also a high density polyethylene sheet with a film thickness of 20 $\mu$m. The thermal insulating article 1 was prepared in a manner as described below by referring to FIGS. 6 and 7.

The glass wool mat was dried by the drying machine 12 to shape it to show a density of 10 Kg/m³ and a thickness of 140 mm. The glass wool mat was then cut to show a width of 430 mm to produce a continuous mat 200. The continuous mat 200 was transferred by the conveyor 14 at a rate of 40 m/min, and cut by means of the cutting machine 13 to make it show a length of 1370 m, to obtain unit mats 2.

The switching time of the stopper 15 was controlled or regulated to supply mats 2 intermittently. Each mat was separated from the succeeding adjacent mat by 200 mm as measured between the rear end surface of the preceding mat and the front end surface of the succeeding mat.

Hot melt type adhesive was sprayed onto the upper surface film 3 and the lower surface film 4 by means of the respective sprayers 16, 17, and the upper surface film 3 and the lower surface film 4 were bonded respectively to the upper surface and the lower surface of the mat 2. The upper surface film 3 and the lower surface film 4 were also bonded along the edge lugs 6. Each of the edge lugs 6 had a width of 25 mm.

When observed at the sag absorbing/regulating section 21, the sag in the length was 1.33 m. It took 2 seconds to stop the mat 2 at the sealing machine 22, to push and compress the mat 2, to bond the upper surface film 3 and the lower surface film 4 along the end lugs 11, to cut the films between the front end of the mat and the rear end of the adjacent mat, and to restart the transfer of the mat 2. Mats were supplied stably and reliably at a rate of 40 m/min.

A photoelectric sensor and a pulse encoder were used to detect the position of ½L, to stop the transfer of the mat 2 in the sealing machine 22. The press cylinders 27 compress the front end 90A and the rear end 100B, to make the ends 9A, 10B show a height of 95 mm. Then, the upper surface film 3 and the lower surface film 4 were bonded and cut. The obtained thermal insulating article 1 showed a height of 110 mm at the ends 9A, 10B as described above due to the resiliency of the mat 2.

The thus obtained thermal insulating article 1 was then compressed to reduce its volume to one eighth, and packaged. The end lugs 11 were never caught by the packaging machine. Nor the upper surface film 3 was damaged.

According to the invention, a rectangularly parallelepipedic mat made of an aggregate of inorganic fibers is covered by synthetic resin films along the upper and lower surfaces and the lateral surfaces thereof, and the films are bonded along the edge lugs. Additionally, according to the invention, the mat is also covered along the front and rear end surfaces by the films. In other words, the mat is covered by films along the entire surface thereof, and the films are bonded to completely seal the mat, so that it can effectively prevented from giving rise to any itchy and stimulating unpleasant feeling to the user by fine fibers scattered from the end surfaces of the mat.

According to the invention, for each mat, the upper surface film is provided with an additional length necessary for it to cover the front end surface and the rear end surface of the mat, while the lower surface film is provided with an additional length necessary for it to be bonded to the upper surface film as in the case of the prior art and, furthermore, the upper surface film is allowed to have a longitudinal margin that is produced as the mat is compressed from the upper surface toward the lower surface by a predetermined height along the end surfaces with the upper surface film, so that the minimum sealing length is secured for the film covering the end surfaces without problem, to reduce the cost of the film coat and produce a great economic advantage.

When covering the mat at the front and rear end surfaces, the mat with the upper surface film is pushed downwardly toward the lower surface of the mat along the end surfaces by a predetermined height to reduce the thickness of the mat. In other words, the mat is compressed and dimensionally reduced only at the ends, while the remaining part of the mat is not compressed and maintain the original thickness, so that the tensile force of the film is applied only to the ends when the upper and lower surface films are bonded along the end lugs between the front end surface of the mat and the rear end surface of the adjacent mat. Therefore no excessive tensile force is applied to the film coat, and hence the films are free from being peeled off along the bonding areas and other problems.

As described above, no excessive tensile force is applied to the film covering the upper surface of the mat when the film is made to cover the end faces and bonded it to the lower surface film along the end lugs extending from the lower edges of the end surfaces, the thermal insulating article is made to maintain the original thickness in most of the areas between the front and rear end surfaces.

According to the invention, by regulating the switching time of the stopper, the interval between two adjacently located mats that are transferred intermittently can be made equal to the sum of the length of the upper surface film necessary for it to cover the oppositely disposed end surfaces of the adjacent mats and the length corresponding to end lugs extending from the lower edges of the end surfaces. The switching time of the stopper can be regulated and controlled without any difficulty.

Additionally, since a sag absorbing/regulating section is arranged on the mat transfer route at a position upstream to the sealing section and the intermittent conveyor, mats can be transferred continuously at the upstream side of the sealing section and the intermittent conveyor, even if each mat is stopped at the sealing section to cover the oppositely disposed end surfaces of itself with the films and to bond the films. Therefore, the temporary stop of mats does not adversely affect the manufacturing efficiency.

In the sealing section, adjacently located mats with the upper surface film are pushed and compressed along the edge lugs of the mats to a predetermined height. Thus, even the tensile force acts to the upper surface film between the oppositely disposed end surfaces, the tensile force does not affect the upper surface film on the upper surface of the mat. Therefore, the front and rear end surfaces can be covered by the upper surface film, while maintaining the thickness of the mat to a uniform value between the front and rear end surfaces without compressing and deforming the mat at the supper surface thereof due to the tensile force applied to the upper surface film covering the upper surface of the mat.

Additionally, the mats are stopped at a position where the center of the interval separating any two adjacent mats is aligned with the center of the sealing section by means of a position sensor, then the front and rear end surfaces of the mats are covered by the upper surface film, and the end lugs are formed and cut. Therefore, even if the interval between the oppositely disposed front and rear end surfaces of two adjacent mats is controlled in a manner as described above, the adjacent mats and hence the adjacent thermal insulating articles can be separated accurately at the central position of the interval to eliminate any waste of film and produce high quality thermal insulating articles.

Thus, according to the invention, high quality thermal insulating articles can be manufactured highly efficiently without wasting film.

What is claimed is:

1. A thermal insulating article comprising a rectangularly parallelepipedic mat of an aggregate of inorganic fibers, a synthetic resin upper surface film and a synthetic resin lower surface film; wherein said upper surface film covers an upper surface of said mat, is bent to extend to a lower surface of the mat along lateral surfaces of the mat, and is bonded to the lower surface film along edge lugs;

said upper surface film is bent to extend to the lower surface along front and rear surfaces of the mat, and is bonded to the lower surface film; characterized in that said mat comprises a front end section, a rear end section and a central section;

said mat with the upper surface film is pressed downwardly at the front and rear end sections by a predetermined depth;

the front end surface, the rear end surface and the upper surface of the mat are covered by the upper surface film which has a sum of a length for covering the upper surface of the mat, a length to be used for being bonded to the lower surface film and a marginal length produced by reducing the thickness of the mat at the front and rear end sections; and said mat has a predetermined thickness at the central section.

2. A method of manufacturing a thermal insulating article comprising a mat of inorganic fibers,, an upper surface film bonded to an upper surface of the mat and a lower surface film bonded to a lower surface of the mat, said upper surface film and said lower surface film being bonded to each other along edge lugs and end lugs of the thermal insulating article; said method comprising steps of:

forming a continuous source mat of inorganic fibers having a predetermined density and a predetermined thickness by means of a drying machine;

forming rectangularly parallelepipedic unit mats by cutting the continuous mat to a predetermined length;

feeding unit mats intermittently so as to make adjacent mats show an interval therebetween by regulating switching time of a stopper, the interval being sum of a length of the upper surface film necessary for it to cover the oppositely disposed end surfaces of the adjacent mats and a length of the upper surface film necessary for it to be bonded to the lower surface film;

covering the upper surface of each mat by the upper surface film by bonding the upper surface film to the upper surface of the mat, and also covering the lower surface of the mat by bonding the lower surface film to the lower surface of the mat;

bonding the upper surface film and the lower surface film along the edge lugs;

causing the mat to pass through a sag absorbing section, and feeding it to a sealing machine;

stopping the mat at a time of alignment of a center position of the interval of adjacent mats and a center of said sealing machine;

compressing the rear end section of a mat and the front end section of the adjacent mat to a predetermined thickness, and maintaining the compression;

pressing the upper surface film downwardly between the rear end section of a mat and the front end section of the adjacent mat, to contact the upper surface film to the lower surface film along the rear end surface of a mat and the front end surface of the adjacent mat;

bonding the upper surface film and the lower surface film near the rear end surface of a mat and the front end surface of the adjacent mat; and cutting the upper surface film and the lower surface film at said center position, to form the thermal insulating article.

3. The thermal insulating article manufactured by the method according to claim 2.

\* \* \* \* \*